United States Patent Office 3,457,963
Patented July 29, 1969

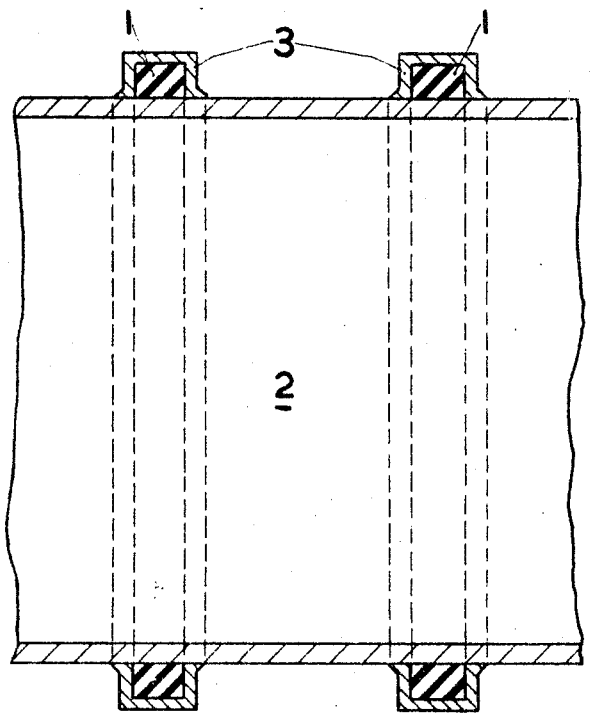
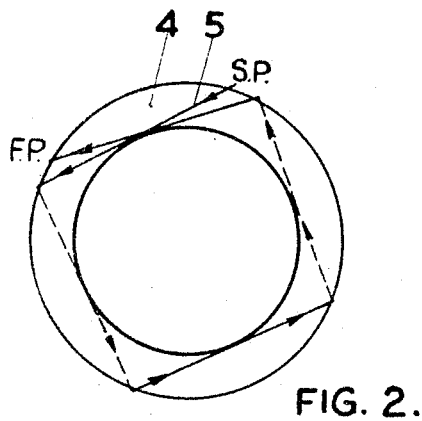
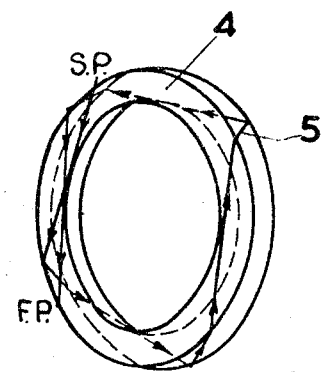
FIG. 1.
FIG. 2.
FIG. 3.

3,457,963
ARTICLE AND METHOD OF BONDING REINFORCED RINGS TO TUBULAR ARTICLES
John Gordon Hardwick, Broadwaters Heath, Kidderminster, England, assignor to Imperial Metal Industries (Kynoch) Limited, London, England, a corporation of Great Britain
Filed July 9, 1965, Ser. No. 470,689
Claims priority, application Great Britain, July 20, 1964, 29,456/64
Int. Cl. F16l 9/12
U.S. Cl. 138—172
2 Claims

ABSTRACT OF THE DISCLOSURE

A method is disclosed for making filament wound reinforced rings suitable for use as a stiffening rib for tubular articles. The method disclosed comprises the steps of providing at least one layer of continuous filament bound fiber on the outer surface of an annular former by winding the filament under tension so as to traverse the flat annular faces defined by the outer circumference of the annular former in a series of straight-line paths which are chordal to the circumference, the successive chords being located on opposite faces of the former and the mid-points of the chords across the circular face of the former defining the inner circumference of the former. Following the winding of the filament on the annular former, the layer of filament is impregnated with a curable resin and the resin then cured.

---

This invention relates to the production of tubular articles and, in particular, to a method of making filament-wound reinforced plastic rings, which are suitable for use as stiffening ribs for tubular articles.

According to the invention, a method of making a filament-wound fibre-reinforced plastic rings, suitable for use a stiffening rib for a tubular article, comprises providing at least one layer of continuous filament-wound fibre on the outer surface of an annular former, impregnating the layer or layers with a curable resin and curing the resin, the filament being wound about the outer surfaces of the former so as to traverse the flat annular faces defined by its outer circumference, under tension, in series of straight-line paths which are chordal to said circumference, succesive chords being located on opposite faces of the former until a complete layer of filament has been wound on, the mid-points of the cords across each circular face then defining an inner circumference of the ring.

The term "chord" as used in this specification excludes diameters, since windings incorporating them would produce discs rather than rings. The term "outer surfaces" is used to mean the outer curved surface and flat annular surfaces defined by the outer circumference of the former. A complete layer consists of a sufficient number of filamentary circuits of the former to cover the entire surface over which the windings are arranged.

Preferably the former comprises an annulus of rectangular cross-section so that the final ring comprises a fibre-reinforced annular structure having a cross-section of inverted U-shape.

It is convenient to mount the former for rotation about its axis so that filament may be fed onto it as it is rotated. This may be accomplished by mounting the former transversely upon a cylindrical mandrel having an outer diameter equal to the inner diameter of the former.

The mandrel may consist of a steel cylinder which is removable from the ring when it is fully cured, or may be the tubular article which it is intended to stiffen. In the latter case, the annular former will, of course, form an integral part of the final structure, the resin-impregnated filaments serving to bond the ring to the article at the mid-point of each chord.

The former may comprise a hollow shell of resin-impregnated tubular braid, foamed plastic or an extrusion of plastic material if it is to form part of the finished article, but if it is to be mounted on a removable mandrel, the former may be sectioned to enable it to be removed from the cured plastic ring. When this is done, the former may be made from steel or the like, the important characteristic being robustness rather than lightness as is the case with integral formers. In both cases it is important that the former should possess sufficient strength to resist deformation by the compressive forces imposed on it by the filament during the winding and curing processes. The thickness of the annular former is not important. It may be made, for example, in the form of pierced disc or wire ring supported by radial spokes; in these cases substantially all of the filamentary materials will be located on the flat faces of the former.

Because of the winding pattern chosen, plastic rings produced by the method of the invention have unusually high resistance to radial compressive forces, as such forces will be translated into a tensile force in the particular chord of filament at right angles to the direction of the applied force. Thus it is possible to make the most efficient use of the reinforcing material by choosing filaments which possess high tensile strengths.

Any filamentary material possessing a sufficiently high tensile strength may be used, but it is preferred to use multi-strand glass rovings specially selected for their tensile strength.

The resin may be of the hot or cold curing type, e.g. an epoxy resin, and impregnation achieved by passing the filament through the resin immediately before winding, coating the former with resin before winding, impregnating the wound layer before curing or using pre-impregnated filament.

Reinforced plastic rings made by the removable mandrel and former technique previously described may be fitted about the tubular article to be stiffened and bonded to its outer surface. They may also be used as spacers between coaxial layers in multi-walled tubes. When this is done, each chord of filament will run from outer to inner to outer wall and be bonded to both. This construction imparts considerable resistance to crushing loads in a multi-wall tube.

Stiffening rings according to the invetnion are ideal for stiffening tubular articles which are themselves made from fibre-reinforced plastics, but the rings may also be used to stiffen articles made from, say, thin metal sheets. This may result in a significant saving in weight or even cost in the case of the newer, expensive structural metals, e.g. titanium.

In order that the invention may be more fully understood, a specific embodiment will be described, by way of example only, with reference to the accompanying drawing, of which:

FIGURE 1 is a longitudinal section through a tubular structure comprising a tube stiffened by plastic rings made according to the invention;

FIGURES 2 and 3 are diagrammatic views of formers illustrating the winding pattern used.

Referring to FIGURE 1, annular formers 1, comprising rectangular-sectioned rings of hard rubber, were forced over a tube 2 of glass-reinforced plastic, formed by conventional technique, and spaced apart along the length of tube 2.

Tube 2 was rotated about its longitudinal axis, and several layers of glass rovings 3 were wound, under tension, onto the outer surfaces of each former 1. The filament was passed through a guide (not shown) which was oscillated from face to face of the former during the winding operation.

The winding scheme used may be more fully explained by reference to FIGURES 2 and 3. In FIGURE 2, former 4 comprises a thin annular disc about which just over one turn of a single filament has been wound, the broken lines representing those lengths of the filament which are behind the disc. Since the filament is wound under tension, it runs from the starting point (S.P.) to the finishing point (F.P.) in a series of straight line paths, as indicated by the arrows, changing from one face of the former to the other each time it changes direction at the outer circumference of the former.

When the former 4 has an appreciable thickness, as shown in FIGURE 3, the filament 5 follows the same general path on the flat faces, but the tension in the filament causes it to assume a geodetic path between successive chords on opposite faces of the former. This means that the end of one chord and the start of the next are displaced peripherally, unlike those in FIGURE 2, where the annular disc has substantially no thickness.

It will be seen that the starting points of successive turns are staggered round the outer periphery of the former so that, if sufficient turns are wound on, the whole of the outer surface is eventually covered by a layer of filament.

In the actual winding process used in the embodiment, the formers 1 were mounted on mandrel 2; this caused the mid-points of the filamentary chords to build up in thickness in the angle between the rings and mandrel giving the completed windings 3 a "top-hat" cross-section. This had the advantage of giving a larger area of contact between the rings and the structure to be reinforced.

The completed windings 3 were coated with an epoxy resin and the whole structure cured at 130° C. for two hours and at 150° C. for a further 2 hours.

I claim:
1. A tubular structure comprising a tubular article and at least one filament-wound reinforced plastic stiffening ring encircling said tubular article and being bonded to the outer surface thereof, comprising at least one layer of continuous filament impregnated with resin, the resin having been cured, the filament taking a series of straight line paths which are chordal to the outer circumference of the ring, successive chords being located on opposite annular faces of the ring and mid points of the chords across each annular face defining an inner circumeference of the ring.

2. A method of winding reinforcement rings for radially reinforcing a tubular article, including the steps of providing an annular former which comprises a radial outer surface and opposed annular faces, the annular faces being defined by outer and inner circumferences of the former, mounting the annular former transversely on the tubular article to be reinforced to provide a tubular structure, winding at least one layer of resin impregnated continuous filament over the radial outer surface and the annular faces of the former, and curing the resin, the filament being wound under tension so as to traverse the flat annular faces in a series of paths which are chordal to said outer circumference, successive chords being located on opposite faces of the former until a complete layer of filament has been wound on, the mid points of the chords across each annular face then defining the inner circumference of the ring, and the former becoming an integral part of the final structure.

References Cited

UNITED STATES PATENTS

| | | | |
|---|---|---|---|
| 1,299,410 | 4/1919 | Steinle | 156—397 |
| 2,115,636 | 10/1935 | Kinnear et al. | 242—2 |
| 3,047,191 | 7/1962 | Young | 156—175 XR |

EARL M. BERGERT, Primary Examiner

M. E. McCAMISH, Assistant Examiner

U.S. Cl. X.R.

156—172